Figure 1:
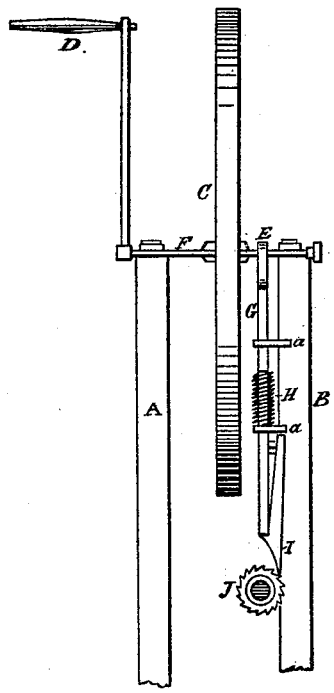
Figure 2:
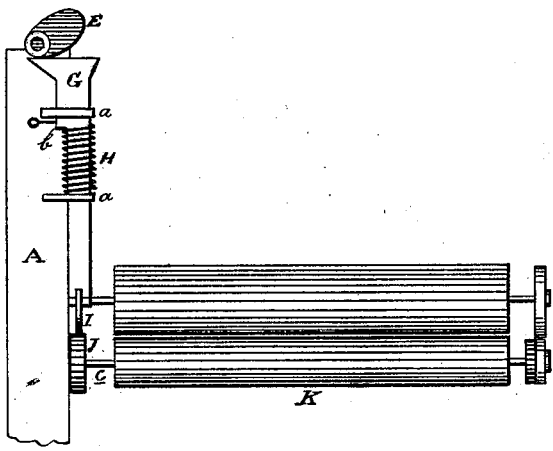

J. ELLIOTT.
STRAW-CUTTER.

No. 177,385. Patented May 16, 1876.

WITNESSES:
Henry Beech,
Philip J. Edmund,

INVENTOR:
John Elliott

UNITED STATES PATENT OFFICE.

JOHN ELLIOTT, OF LONDON, CANADA.

IMPROVEMENT IN STRAW-CUTTERS.

Specification forming part of Letters Patent No. 177,385, dated May 16, 1876; application filed July 6, 1875.

*To all whom it may concern:*

Be it known that I, JOHN ELLIOTT, of the city of London, in the county of Middlesex, in the Province of Ontario, Canada, have invented certain Improvements on a Machine for Cutting Hay and Straw, for which United States Patent No. 128,621, dated July 2, 1872, was granted to Thomas Hazard, of the town of Wilmington, in the State of Ohio, of which the following is a specification:

My improvement consists of a device for communicating motion from the cam and operating shaft and crank directly to the lower feed-roller in a more simple and precise manner than has heretofore been done.

Referring to the accompanying drawing, A B represent the two standards of the frame of straw-cutter, and C the balance-wheel, provided with operating-crank D in the usual manner. E is the oval cam, operated by the shaft F. Immediately below this cam, and at side of standard B, I affix the ratchet-slide G in suitable guards, a, which allow of its moving freely up and down within a certain limit inside the coil-spring H. This coil-spring lifts under the projecting head b of the slide and raises it directly it is released from the downward pressure of the oval cam E in the revolution of the latter on the shaft F. To the lower end of the slide is attached the ratchet-dog I, and when the slide is forced down by the cam on top, the lower end of this dog I strikes upon one of the teeth of the ratchet-wheel J immediately below it and forces it down, thus turning the ratchet-wheel and communicating motion to the lower feed-roller K, onto the shaft c of which the ratchet-wheel J is pivoted. When released from the direct action of the cam, the spring H causes the slide to rise, and with it the dog I, in readiness for the next stroke.

I claim as my invention—

The ratchet-slide G, coil-spring H, dog I, and guards a a, in combination with the cam E, ratchet-wheel J, and feed-roller K, operating substantially as and for the purpose specified.

JOHN ELLIOTT.

Witnesses:
HENRY BEECH,
PHILIP J. EDMUND.